A. SEARLS.
Carriage.
No. 72,091.
Patented Dec. 10, 1867.
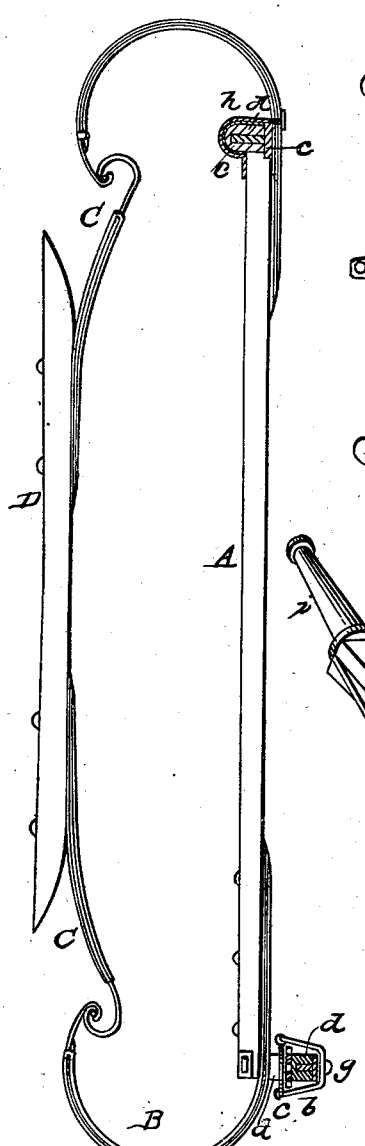
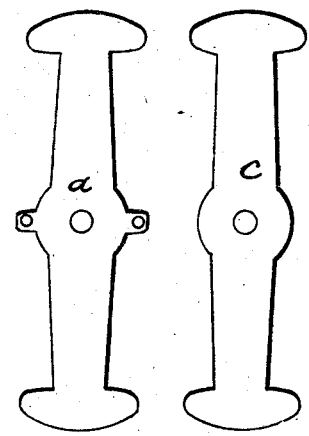
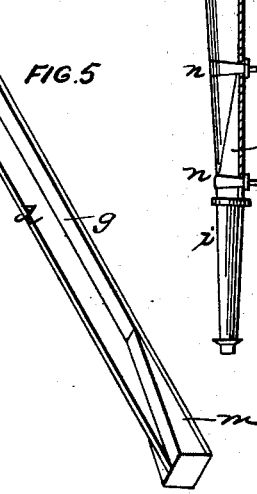
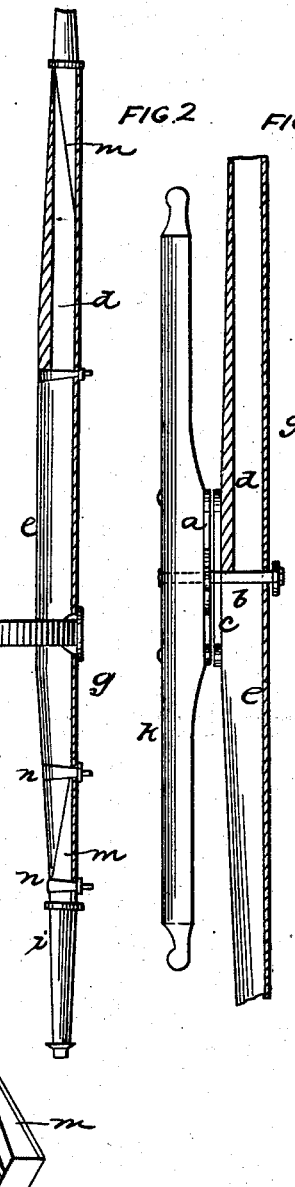
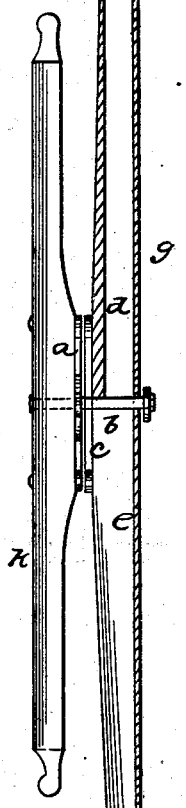
WITNESSES
Geo. W. Smith
Geo. H. Strong
INVENTOR
Anson Searls

United States Patent Office.

ANSON SEARLS, OF SAN FRANCISCO, CALIFORNIA.

Letters Patent No. 72,091, dated December 10, 1867.

IMPROVEMENT IN CARRIAGES.

The Schedule referred to in these Letters Patent and making part of the same.

TO ALL WHOM IT MAY CONCERN:

Be it known that I, ANSON SEARLS, of San Francisco city and county, State of California, have invented certain new and useful Improvements in "Carriages;" and I do hereby declare the following description and accompanying drawings are sufficient to enable any person skilled in the art or science to which it most nearly appertains to make and use my said invention or improvements, without further invention or experiment.

My invention relates to a steel axle, constructed like an inverted T, which very much strengthens it with less metal; it also relates to an improved steel circle, upon which the body turns on the front axle, the whole forming a combination which is cheaper, easier, and more durable than any now in use.

To more fully explain my invention, reference is had to the accompanying drawings, forming part of this specification, of which—

Figure 1 is a side elevation, with section of axle.
Figure 2 is a back view.
Figure 3 is a front view.
Figure 4 is a view of the plate of the circle.
Figure 5 is a perspective view of the axle.

The axles are constructed of steel, having the flat bar $g$, to which are welded, at each end, the axle-arms, upon which the wheels turn. A flat steel bar, $d$, having its ends bevelled, as shown, is let into the axle-bed $e$, so that its greatest diameter is at right angles with the greatest diameter of the bar $g$, and is also in the direction of the strain. This bar, with the axle-bed, is secured firmly to the bar $g$ by the clips $n$, thus forming a light and very strong axle. The circle is composed of an upper plate, $a$, and a lower plate, $c$. A clip passing through the plate $a$ and under the axle, as shown in fig. 1, secures the whole and keeps it from rattling, and also prevents accidents in case of the king-bolt breaking.

By means of these improvements I am enabled to construct buggies much cheaper and more durable than any now in use.

Having thus described my invention, what I claim, and desire to secure by Letters Patent, is—

1. The axle composed of the steel bars $d$ and $g$, attached as herein described.
2. I claim the clip $b$, passing around under the axle, with its ends fastened to the plate $a$ on the rocker, both before and behind the axle, substantially as described.

In witness whereof I have hereunto set my hand and seal.

ANSON SEARLS. [L. S.]

Witnesses:
    C. W. M. SMITH,
    GEO. H. STRONG.